United States Patent [19]
Eisenbraun et al.

[11] Patent Number: 6,035,036
[45] Date of Patent: Mar. 7, 2000

[54] ELECTRICALLY OPERATED TELEPHONE CRADLE

[75] Inventors: Kenneth D. Eisenbraun, Birmingham, Mich.; Tam Ming Kwong, Kowloon, The Hong Kong Special Administrative Region of the People's Republic of China

[73] Assignee: United Industrial Trading Corp., Troy, Mich.

[21] Appl. No.: 08/802,523

[22] Filed: Feb. 20, 1997

Related U.S. Application Data

[63] Continuation of application No. 08/520,707, Aug. 29, 1995, abandoned.

[51] Int. Cl.[7] .................................................. H04M 1/00
[52] U.S. Cl. .......................... 379/446; 379/455; 379/454; 379/426
[58] Field of Search ..................................... 379/446, 426, 379/455, 454, 449; 248/316.4, 281

[56] References Cited

U.S. PATENT DOCUMENTS

| | | | |
|---|---|---|---|
| 4,582,289 | 4/1986 | Gibson et al. | 248/316.4 |
| 4,852,932 | 8/1989 | Komeya et al. | 224/281 |
| 5,305,381 | 4/1994 | Wang et al. | 379/454 |

*Primary Examiner*—Jack Chiang
*Attorney, Agent, or Firm*—Gifford, Krass, Groh, Sprinkle, Anderson & Citkowski, P.C.

[57] ABSTRACT

A cradle for use in a motor vehicle for gripping and releasing a portable cellular phone is shown. A motor moves clamping members toward and away from each other so that no manual adjustment is necessary.

9 Claims, 2 Drawing Sheets

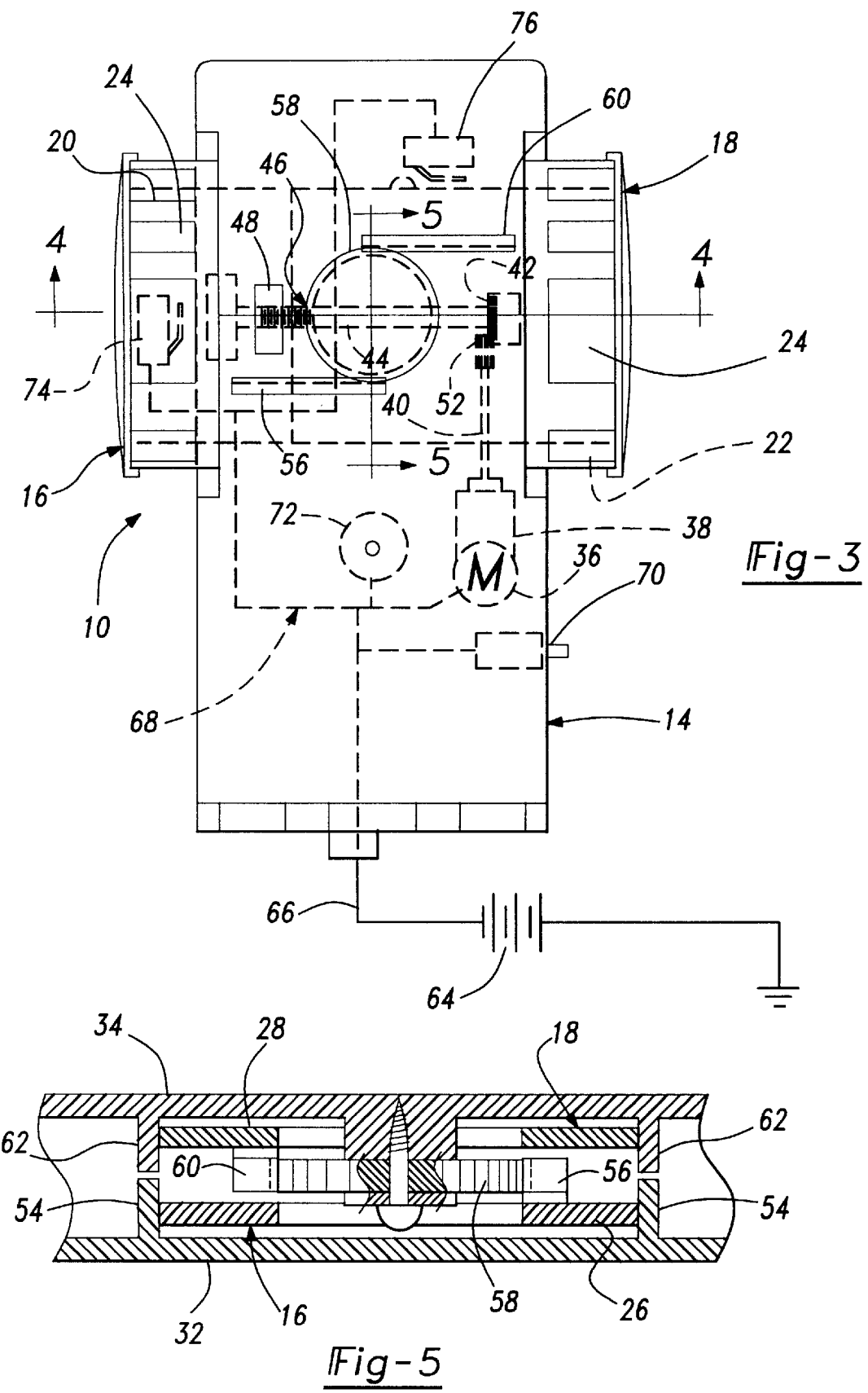

ELECTRICALLY OPERATED TELEPHONE CRADLE

This is a continuation of application Ser. No. 08/520,707 filed on Aug. 29, 1995 now abandoned.

BACKGROUND OF THE INVENTION

1. Field of the Invention

This invention relates to a telephone cradle, more particularly this invention relates to a vehicle mounted telephone cradle for a cellular telephone.

2. State of the Art

Since the early 1980s the cellular telephone industry has seen very dramatic growth. Competitive market prices have made it affordable for larger and larger segments of the American population to own a cellular telephone of one type or another. At the commencement of this expansive growth in the cellular telephone industry the most popular type of cellular phone came with its own platform for mounting the phone in the passenger compartment of the phone owners vehicle. While this innovation in telephonic technology allowed many people to remain in touch with their business or families, the limitation of vehicle mounting still made it impractical for most individuals to own a cellular phone. With further advances in technology the cellular phone soon became transportable in a storage bag allowing free movement outside the vehicle. From the storage bag the phone progressed to a totally independent unit, with the battery and communication equipment compacted into a single hand unit about the size of a standard household handset. The most recent innovations have reduced the hand unit size so as to be able to fit in a person's pocket, briefcase or handbag while retaining all the advantages of their larger ancestors.

This size advantage for the smaller independent units turns into a disadvantage for use in the owner's vehicle, the same place the whole cellular revolution started. As the cellular telephone market moved toward independent hand units and away from being simply car phones, there was less need for phone owners to fit the passenger compartments of their vehicles with a phone mounting platform. This trend has resulted in many modern styles of cellular phones which are not designed for vehicle mounting. The obvious consequence of this development becomes apparent when a phone owner needs to answer or place a call while operating there vehicle. Since their is no longer any phone platform, the phone owner must reach for a phone unit that may have shifted or otherwise moved, during vehicle movement, to a inconvenient location for the phone owner to reach while operating the vehicle. Thus, a need has developed for a phone platform capable of securely holding a wide variety of today's platformless cellular telephones while the phone owner operates his vehicle.

One prior art attempt at a solution to this problem is disclosed in U.S. Pat. No. 5,305,381 issued Apr. 19, 1994 to Wang et al. This patent describes a telephone cradle with two walls extending outward from a base for clamping and holding a cellular telephone on the base. Each wall has a cushion for holding the telephone firmly. The walls are spring loaded and in communication with a ratchet which must be released and finger pressure applied to retract the walls.

SUMMARY OF THE INVENTION

The present invention addresses the problem of supplying a universal cradle capable of receiving, holding and releasing portable cellular telephones of various sizes, and providing such a cradle that does not require manual manipulation to grip or release the telephone. A touch of a switch energizes a motor to cause clamping members to open or close to grip or release the phone.

The cradle has a base supporting first and second clamping members each having a clamping surface facing each other extending outwardly from the base. A motor mounted in the base and activated by a switch slides one or both of the clamping members to move the clamping surfaces toward or away from each other to grip or release a phone placed on the base between the clamping members.

In one embodiment, a single reversing switch is used to open and close the clamping members, changing the polarity of the electrical power supply, in order to change the direction of movement. In another embodiment two switches are used. One switch, located on the side of the base is used to open or move the clamping members apart. The second switch is preferably located on the base between the clamping members so that when the phone is placed on the base it activates the switch to move the clamping members toward each other to hold the phone.

In a preferred embodiment, an additional pressure sensitive switch or proximity switch is located adjacent one of the clamping surfaces to disconnect the power supply when the clamping members have been moved toward each other and are gripping the phone. A second proximity or limit switch is also preferred to disconnect the power supply when the clamping members are moved apart to their maximum open position.

The power supply can be connected to the vehicle battery or electrical system or it can be from a self-contained battery in the base. A cigarette lighter connection can optionally be used to obtain power from the vehicle electrical system.

In a preferred embodiment, the motor rotates a pinion through a gear reducer and output shaft. The pinion rotates a screw drive through a ring gear, and one of the clamping members is moved by the screw through a nut fixed to the clamping member. In an embodiment where both clamping members are moved toward and away from each other, a rack and pinion drive is used between the members so that a first rack attached to the clamping member moved by the screw drive will rotate a pinion to engage a second rack attached to the other clamping member to move it.

BRIEF DESCRIPTION OF THE DRAWING

The present invention will be more fully understood by reference to the following detailed description of the preferred embodiments of the invention when read in conjunction with the accompanying drawing, in which like reference characters refer to like parts throughout the views, and in which:

FIG. 3 is a plan view;

FIG. 5 is a cross-sectional view taken along line 5—5 of FIG. 3.

DETAILED DESCRIPTION OF THE PREFERRED EMBODIMENTS

Figure 1:
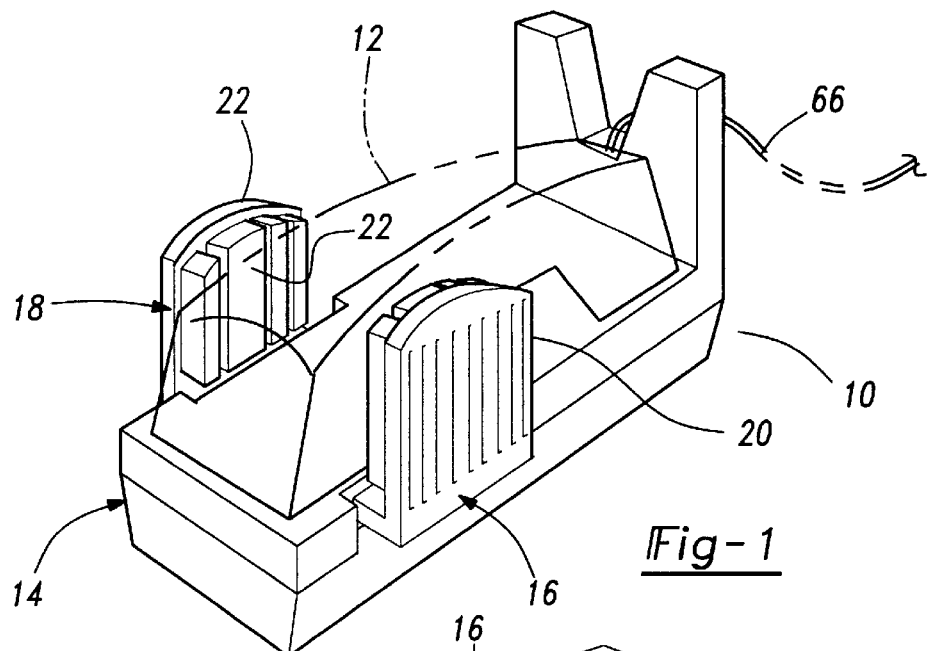
FIG. 1 is a perspective view of the cradle of this invention with a phone shown in phantom being held by the cradle.
Figure 2:
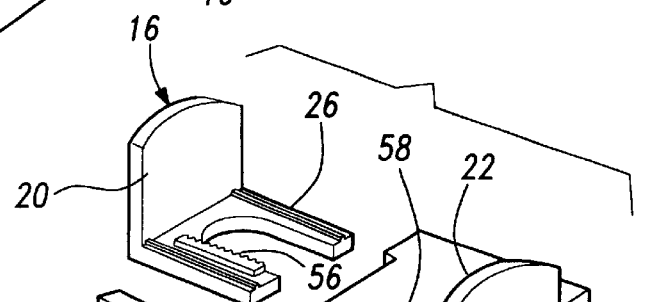
FIG. 2 is a partially exploded perspective view of the cradle of the invention.

Referring to FIGS. 1 and 2, the telephone cradle 10 of this invention is shown holding a portable cellular telephone 12. The phone is supported on the cradle base 14 between two clamping members 16 and 18, at least one of which members 16, is slidable toward and away from the other clamping member 18 to grip and release the phone.

The clamping members 16 and 18 each have an outward extending clamping surface 20 and 22 facing each other and each preferably having a resilient compressible pad 24. In the embodiment illustrated, both clamping members 16 and 18 are slidable to move the clamping surfaces 20 and 22 toward and away from each other. Clamping members 16 and 18 have leg portions 26 and 28 connected to the clamping surfaces 20 and 22 and extending into the base 14 between upper and lower base members 32 and 34.

Figure 4:
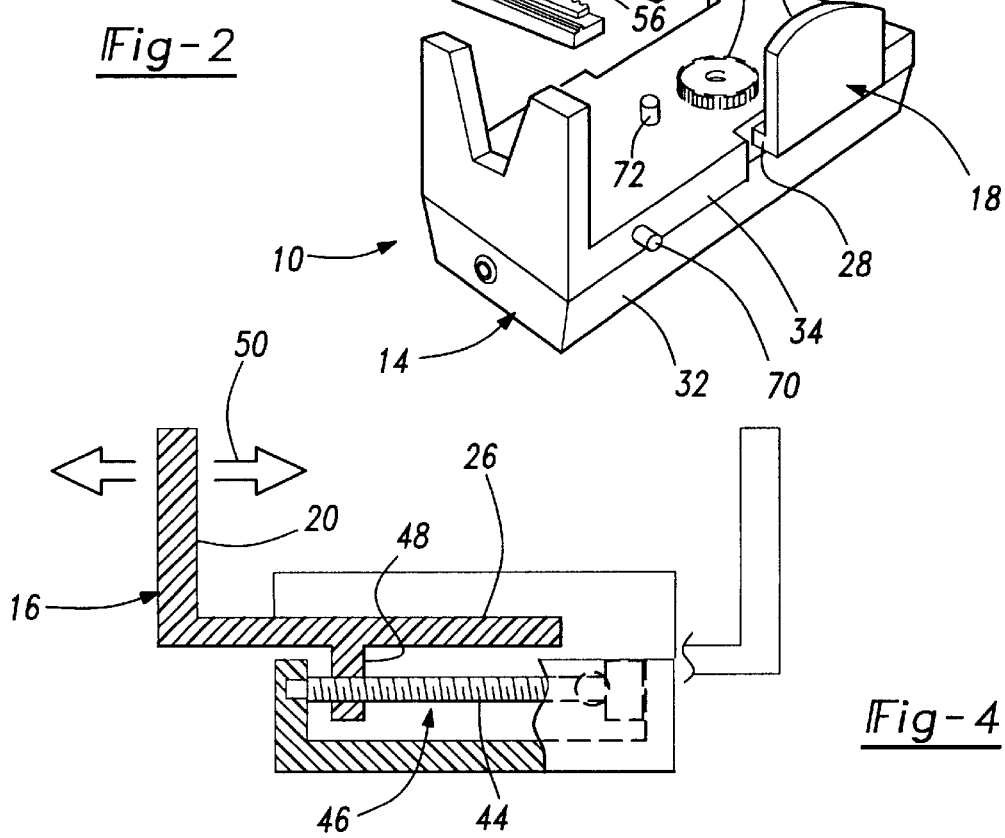
FIG. 4 is a partial cross-sectional view taken along line 4—4 of FIG. 3.

Referring to FIGS. 3–5, an electric motor 36 is housed in base 14 and is connected to a suitable gear reducer 38. The output shaft 40 of the gear reducer 38 carries a pinion gear 52 in mesh with a ring gear 42 to rotate the screw 44 of screw and nut drive 46. Nut 48 is integral with the leg 26 of clamping member 16 so that as the screw 44 is rotated in opposite directions it will reciprocate the clamping member 16 as shown by the arrows 50 in FIG. 4. The leg portion 26 of clamping member 16 is guided by guide members 54 molded integrally with the lower base member 32 as seen in FIG. 5. In some embodiments the clamping member 16 may be the only moving member with the clamping member 18 remaining stationary.

In the illustrated embodiment where both clamping members 16 and 18 are moved, the leg portion 26 of clamping member 16 carries a rack gear 56 which meshes with and rotates a pinion 58. The pinion 58 meshes with a rack gear 60 on the leg portion 28 of clamping member 18 to reciprocate this member in unison with clamping member 16. The leg portion 28 of clamping member 18 is guided by guides 62 molded integrally with the upper base member 34.

Power is supplied to the motor 36 from a power supply 64, which may be the vehicle power supply, through a cord 66 to a switching circuit 68, shown in a simplified manner. Power can alternatively be supplied from batteries located in base 14.

In one embodiment, the switching circuit 68 can include a single push button reversing switch 70 mounted on the side of the base 14. Pressing the switch 70 will connect the power supply 64 to the motor 36 to move the clamping members apart. Power can be interrupted by release of the switch button or by pressing the switch a second time. When the phone has been placed on the base 14, the switch 70 can be depressed again to supply power to the motor 36 to move the clamping members toward each other. Reversal of the motor can be accomplished by reversing the polarity of the electrical power supply through the switch. When the phone has been clamped, power to the motor can be interrupted by release of the switch button or by pressing the switch another time.

In another embodiment, the switching circuit can include a second switch 72 located on the upper base member 34. Switch 70 is then used only to move the clamping members apart. When the phone is placed on the base 14, the second switch 72 will be closed to close the clamping members and grip the phone. With this embodiment, a third switch 74 can be supplied in one of the clamping members, shown in clamping member 16 in FIG. 3, to disconnect the power supply when the phone has been gripped. Preferably a fourth switch 76 is also used in this embodiment to disconnect the power supply when the clamping members have been moved to their open position. End wall 78 is provided on base 14 so that the phone 12 can be consistently placed on the base with one end in contact with the wall.

It will be readily apparent that many variations can be made in the switching circuit without departing from the invention being taught.

We claim:

1. A cradle for holding a portable telephone of variable size comprising:
   a hollow base having an internal cavity, the internal cavity defined by a plurality of side walls, a top panel and a bottom panel, said portable telephone placeable on the top panel;
   a first clamping member supported on said base and having a first clamping surface projecting generally outward from said base;
   a second clamping member having a second clamping surface projecting generally outward from said base, facing said first clamping surface, and being slidably supported on said base;
   a motor supported within the internal cavity of said base for smoothly sliding said second clamping member to move said second clamping surface toward and away from said first clamping surface;
   a switching circuit arranged to connect an electrical power supply to said motor to cause said second clamping member to move toward and away from said first clamping member, said switch in circuit including a switch means to disconnect the power supply when said deplane is gripped; and
   said telephone being held on the top panel between said first and second clamping members by urging said second clamping member to move toward said first clamping member until said telephone is contacting both said first and second clamping members.

2. The cradle according to claim 1 wherein said first clamping member is slidably supported on said base, and said motor is arranged to move said first and second clamping members toward and away from one another by means of driving a rack gear enmeshed with a rack and pinion.

3. The cradle according to claim 1 wherein said switching circuit includes a reversing switch.

4. The cradle according to claim 1 wherein said switching circuit includes a first switch arranged to connect said electrical power supply to said motor to move said second clamping member away from said first clamping member, and a second switch arranged to connect said electrical power supply to said motor to move said second clamping member toward said first clamping member.

5. The cradle according to claim 4 wherein said switching circuit further includes a third switch arranged to disconnect said power supply to said motor when said second clamping member is being moved toward said first clamping member and said second clamping member contacts a telephone placed on said base between said first and second clamping member.

6. The cradle according to claim 1 further including resilient pads connected to said first and second clamping surfaces.

7. The cradle according to claim 1 wherein said first clamping member is slidably supported on said base, and said motor is arranged to move said first and second clamping members toward and away from each other by means of driving a linear rack gear enmeshed with a rack and pinion.

8. A method for selectively holding a portable telephone of variable size comprising:

providing a cradle having an internal cavity, a top panel, and a second clamping member opposing said first clamping member, said first and second clamping members extending outward from the top panel, wherein said first and second clamping members insert into the internal cavity, an electric motor within the internal cavity and switching circuitry thereto, to change the lateral distance between said first and second clamping members, and an electric power supply to said motor;

placing a telephone in contact with the top panel of said cradle, between said first clamping member and said second clamping members;

activating said electric motor by means of said telephone contacting said cradle, thereby urging said second clamping member slidably towards said first clamping member and gripping said telephone;

deactivating said electric motor upon said telephone being gripped between said first and second clamping members;

energizing said electric motor by means of a switch, thereby urging said second clamping member, slidably away from said first clamping member and disengaging said telephone from contact with said second clamping member; and de-energizing said electric motor upon said second clamping member attaining a pre-determined lateral distance from said first clamping member.

9. The method of claim 8 wherein activating said motor urges said first clamping member slidably towards said second clamping member concurrently with said second clamping member sliding towards said first clamping member.

* * * * *